Feb. 11, 1941.  R. A. MERRILL  2,231,769
METHOD OF TREATING RUBBER MOUNTINGS
Filed June 22, 1938  3 Sheets-Sheet 1

INVENTOR.
ROBERT A. MERRILL
BY Gourley & Bradley
ATTORNEYS.

Feb. 11, 1941.  R. A. MERRILL  2,231,769
METHOD OF TREATING RUBBER MOUNTINGS
Filed June 22, 1938  3 Sheets-Sheet 3

INVENTOR.
ROBERT A. MERRILL
BY
ATTORNEYS.

Patented Feb. 11, 1941

2,231,769

UNITED STATES PATENT OFFICE 2,231,769

METHOD OF TREATING RUBBER MOUNTINGS

Robert A. Merrill, Detroit, Mich., assignor, by mesne assignments, to United States Rubber Company, New York, N. Y., a corporation of New Jersey Application June 22, 1938, Serial No. 215,182

7 Claims. (Cl. 18—48)

This invention relates to mountings in which a load is sustained through the medium of a vulcanized rubber composition. More particularly, the invention relates to a method of treating a vulcanized or partly vulcanized rubber composition to effect a lower drift in the rubber composition due to the strain imposed by the load which the rubber supports.

In general, the invention comprises that method of treating a rubber composition which includes subjecting the rubber composition to a load in the same direction and manner in which it is to be used in practice, subjecting the composition to an elevated temperature while under load, cooling the rubber, and removing the load, whereby the rubber assumes a permanent set.

Mountings utilizing rubber compositions are used extensively for supporting loads and for preventing transmission of vibrations from the supported load to the support. One of the principal objections to the use of rubber in mountings is the drift of the rubber composition, resulting in a gradual lowering of the level of the supported load. This drift of the rubber composition may be referred to as that phenomenon of slowly increasing deformation relative to time which occurs in the rubber while it supports a constant load. The drift of the rubber is more pronounced in the first few weeks than it is in the succeeding few years.

In accordance with the practice of my invention, I propose to treat the rubber composition in a manner which will decrease the amount of drift in the rubber after it is assembled to support a load. The result of such treatment has the unique and beneficial effect of removing a relatively large percent of drift which occurs in a rubber composition mounting; that is, by prestressing the rubber in the same direction that it is to be stressed during use, and by heat treating the rubber while it is stressed, the rate of drift becomes less throughout its useful life when compared with a similar mounting embodying an untreated rubber composition.

Among the objects of my invention are, to provide a simplified and economical method of treating rubber composition; to decrease the amount of drift in the rubber when subjected to a load; and, to provide greater uniformity in the levels of supported bodies. These and other objects and advantages will appear more fully in the following detailed description, when considered in connection with the accompanying drawings, in which:

Figs. 1, 2, and 3 are perspective views of a tension mounting, illustrating the various shapes of the mounting during different stages of the process;

Figs. 4, 5, and 6 are perspective views of a compression mounting, illustrating similar conditions;

Figs. 7, 8, and 9 are perspective views of a shear type mounting, illustrating similar conditions;

The practice of the present invention includes rubber compositions having different directional stresses such as tension, compression, shear, or combinations thereof; and while the degree of relative movement or drift of the rubber compositions varies in accordance with the direction of stresses, their characteristics and behavior are within the same general class.

Figure 1:
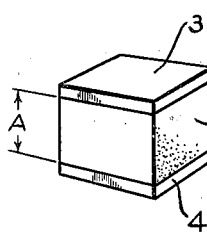
Figure 2:
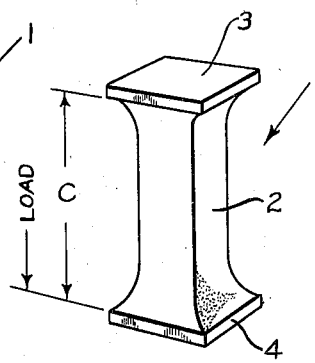
Figure 3:
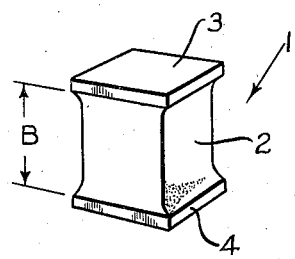

Some of the resulting characteristics of rubber compositions in a state of tension and subjected to the process of the present invention are shown in the drawings, particularly by Figs. 1, 2, and 3. Fig. 1 shows, by way of example, a simple form of mounting 1 adapted to support a load through the medium of a rubber composition 2 subjected to stresses in the form of tension. The rubber composition 2 is bonded to metal plates 3 and 4 which may be attached to a support and a load, respectively.

Fig. 1 illustrates the mounting in its original state; that is, the rubber composition is in its normal, unstrained vulcanized condition. The dimension A represents the free height of the rubber stock of the mounting. The height preferably is less than the resulting height of a treated mounting. In practice, the height of a mounting is fixed within definite limitations and, with such height as a basis, the preferred height of an untreated mounting to be treated may be determined. As an example, and assuming that the height of the rubber composition of the untreated mounting is equal to 100 percent, the height of the finished mounting after treatment is equal to about 150 percent. Stated in another way, the height A of the rubber composition in its normal or free state is equal to 100 percent whereas the height B of the treated mounting in its free state is equal to 150 percent. Obviously, the height of the treated mounting will differ, depending upon the characteristics of the rubber composition and the weight supported by the mounting. Therefore, all figures expressed herein are to be considered as exemplifying a preferred practice of the invention.

In the process of treating a mounting in tension, as shown in Figs. 1, 2, and 3, the plate 3 is supported and a load is applied to the plate 4, resulting in deformation of the rubber composition 2 from the length A of Fig. 1 to the length C, as shown in Fig. 2. After the load is applied, the rubber composition is subjected to an elevated temperature for a period of time.

As a result of the application of a load to the plate 4, as shown in Fig. 2, the rubber composition 2 becomes deformed to the extent that its length C is equivalent to about 300 percent of its original length. The extent of the load, during treatment, is a determining factor in the resulting height or extent of drift of the rubber composition. The load applied to the mounting to effect pre-drift of the rubber may be in the nature of a constant load or constant spacing. If a constant load is applied the length C gradually increases during treatment, depending upon the temperature and the length of time of treatment. During treatment by a constant spacing the distance C remains fixed throughout the treatment. In either case the load is sufficient to impart tension stresses in the rubber composition to the extent that the rubber body becomes permanently distorted. Preferably, the weight of the load should be at least equal to the load which the mounting is intended to support, or it may be double its intended supporting load, or more. The exact weight of the load is a variable factor depending upon the temperature and duration of treatment, and the size of the mounting and characteristics of its composition. In actual practice, a suitable load is provided to stretch the rubber composition to a predetermined length, such as 300 percent of its original length.

After application of the load the rubber composition is subjected to temperatures substantially above the temperatures within the normal operating range of the mounting. The rubber composition may be heated through the medium of steam, hot gases, fluids, or electrical energy. Effective temperatures range between 160° F. to 260° F. As a general rule, the higher the temperature, the shorter is the duration of treatment. However, the upper temperature is limited to a point below that which is detrimental to the rubber composition.

The length of time in which the rubber composition is subjected to elevated temperatures depends upon the size and characteristics of the rubber composition. Relatively large mountings require a longer treatment because of the additional time required for the heat to penetrate the rubber composition. Experiments indicate that good results may be obtained by treating the mounting for a period within the range of 1 to 12 hours at a temperature of 160° F. to 260° F.

Upon completion of the heat treatment the rubber composition is permitted to cool to substantially room temperature while the load is still applied. However, the cooling operation may be omitted. The load is then removed and the rubber composition assumes a relaxed state. After treatment the height of the rubber body of the specific example, represented by B (Fig. 3), is about 50 percent greater than its original height A.

In comparing a treated mounting with an untreated mounting of the same chemical composition and physical dimensions, the treated mounting not only shows substantial advantages in reducing drift in the early stages of application of the mounting, but the relative drift throughout its useful life is lessened. Also, as a general rule, the greater the degree of predrift imparted to the mounting, the less is its relative drift.

Figure 10:
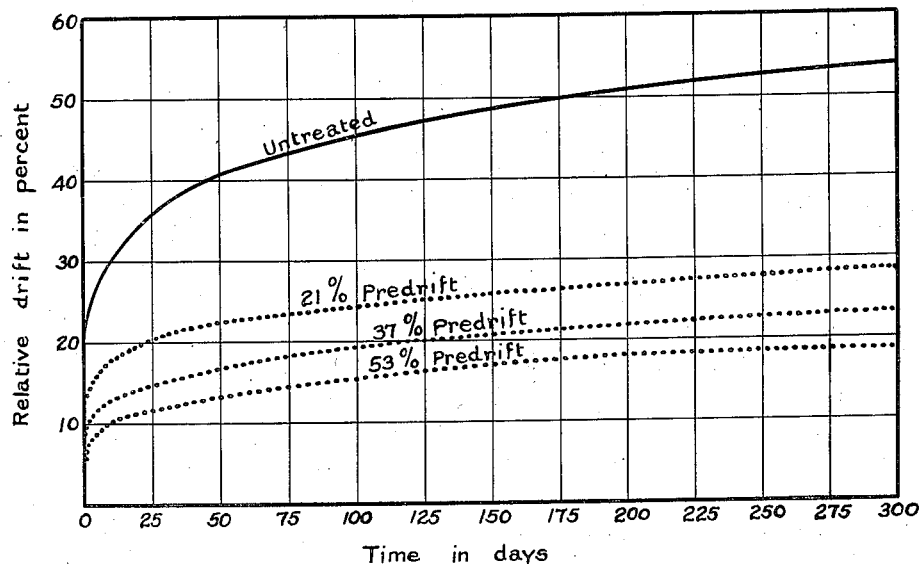
Fig. 10 is a graph showing the curves of examples of treated and untreated rubber composition mountings and the resultant drift relative to time.

A specific example of drift characteristics of treated and untreated rubber compositions is illustrated in the drawings by the chart in Fig. 10. The curved lines in the chart represent a rubber composition of 50 durometer ("Shore" durometer reading) stock, having the general characteristics of the following compounded ingredients:

| | |
|---|---:|
| Rubber | 64.88 |
| Antioxidant | .37 |
| Zinc oxide | 3.50 |
| Carbon black | 25.18 |
| Stearic acid | 1.00 |
| Pine tar | 2.50 |
| Retarder | .13 |
| Accelerator | .56 |
| Sulfur | 1.88 |
| | 100.00 |

As a result of the application of a load to a mounting, either treated or untreated, a gradual deformation of the rubber composition takes place. This deformation is more evident during the early stages of applied load. It is therefore desirable that predrift measurements be determined after the lapse of a definite time period. In the present examples shown in the charts the curves have been plotted on the basis of measurements taken 15 seconds after the application of the supporting load.

The chart (Fig. 10) shows, by the curved full line, the percent of drift of an untreated mounting. The curved dotted lines show the drift characteristic of mountings treated in the order of 21 percent, 37 percent, and 53 percent predrift or permanent set. In order to show that effective results may be obtained by various treatment, each of the predrift mountings represented by the curves has been subjected to different treatments. In particular, these treatments are as follows: 21% predrift, loaded to 150% stretch—4 hours at 190° F. in air; 37% predrift, loaded to 250% stretch—1 hour in boiling water; 53% predrift, loaded to 300% stretch—6½ hours at 190° F. in air.

It may be noted from this chart that the drift characteristics of rubber compositions are relatively high during the first day of sustaining a load, and that the predrifted mountings not only eliminate a considerable amount of initial drift, but result in substantial reductions of drift throughout the useful life of the mounting.

Figure 11:
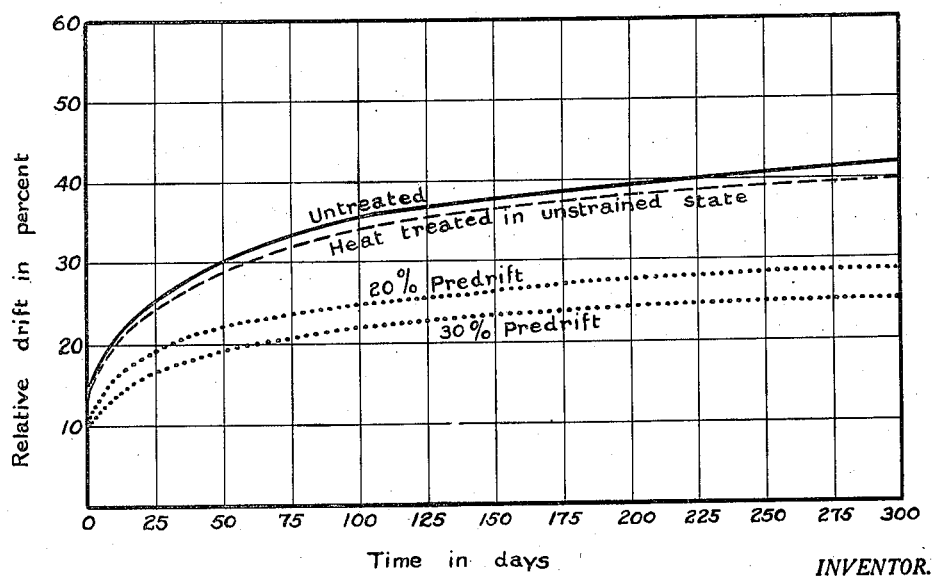
Fig. 11 is a similar chart of a different rubber composition, illustrating that similar characteristics exist for different compositions; and, Fig. 12 is a similar chart, indicating the drift characteristics of synthetic rubber.

Various rubber compositions suitable for mountings of the type herein described indicate substantially the same characteristics when subjected to treatment in accordance with the practice of the present invention. An example of the results of another rubber composition of softer stock having a durometer reading of 40 is shown in the chart in Fig. 11. The ingredients of this composition are as follows:

| | |
|---|---:|
| Rubber | 86.46 |
| Antioxidant | .85 |
| Coloring pigment | .07 |
| Accelerator | .22 |
| Zinc oxide | 8.56 |
| Ammonium chloride | .85 |
| Sulfur | 2.99 |
| | 100.00 |

The full line on the chart (Fig. 11) represents the characteristics of an untreated rubber composition suitable for mounting application. The dotted lines show the curve characteristics of pre-drifted mountings having 20 percent and 30 percent permanent set. The 20 percent predrift mounting was treated by applying a load sufficient to stretch the rubber body a distance equal to 150 percent of its original, untreated length and immersing the mounting in boiling water for a period of one hour. The second test example assumed a 30 percent drift from the application of a load sufficient to stretch the rubber 300 percent of its original, untreated length for a period of 4 hours at 190° F. in air. As shown in the chart, the treated mountings are substantially similar in drift characteristics, and both show considerable improvement when compared with the untreated mounting.

In order to show that the heat treatment alone does not materially affect the drift characteristics of the rubber composition, reference may be had to the dash line (Fig. 11) which illustrates the behavior of a similar body of rubber subjected to the influence of boiling water for 1 hour without the application of a load. The similarity between this test example and the untreated body of rubber composition shows that beneficial results may be obtained only by the complete process which includes the factors of stress, temperature, and time.

The invention as heretofore defined refers to compositions of natural rubber; however, it is intended to include synthetic rubber in so far as such compositions indicate the general physical characteristics of natural rubber compositions. An example of such a synthetic rubber is chloro-2 butadiene-1,3 polymer, compounded in the following manner:—

| | |
|---|---|
| Chloro-2 butadiene-1,3 polymer | 100. |
| Carbon black | 1. |
| Zinc oxide | 10. |
| Retarder | 10. |
| Rosin | 5. |
| Antioxidant | 1.5 |
| Sulfur | 1. |
| Pine tar | 13.5 |
| Softener | 20. |
| Filler | 1.5 |

Figure 12:
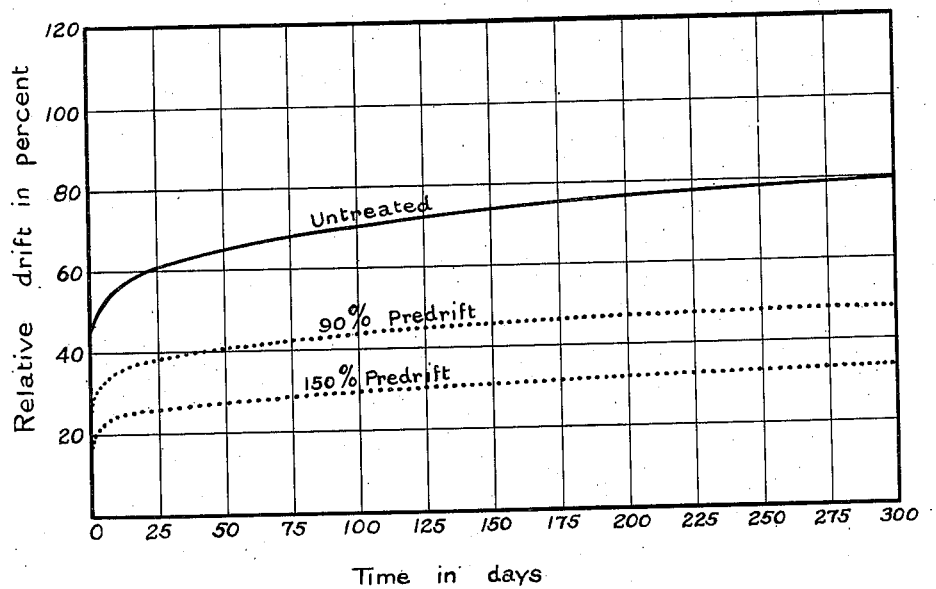

The curves of untreated and treated mountings embodying such synthetic rubber compositions are shown in the chart in Fig. 12. The full line represents the drift characteristics of the untreated composition, and the dotted lines represent similar compositions which have assumed permanent set of 90 percent and 150 percent. The permanent set of 90 percent resulted from the application of a load sufficient to stretch the composition 150 percent of its original untreated length, in boiling water for a period of 2½ hours. The second sample having a permanent set of 150 percent was treated by stretching the body 300 percent while subject to the influence of boiling water for a period of 2½ hours. As the drift behavior of synthetic rubber is substantially similar to natural rubber, it is intended that reference to rubber shall be considered in its broad terminology as including synthetic rubber compositions.

While the foregoing disclosure refers to the drift characteristics of rubber compositions in tension, it is found that the same general condition in varying degrees are applicable to mountings in which the stress is in the nature of compression or shear, or to a combination of stresses, such as torsion.

Figure 4:
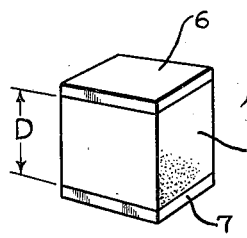
Figure 5:
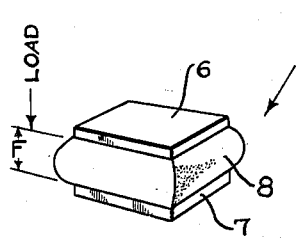
Figure 6:
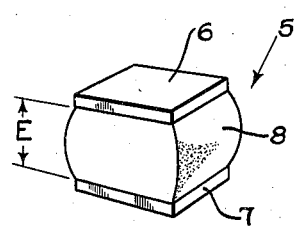

Figs. 4, 5, and 6 illustrate the various stages or shapes to which a mounting is subjected during a predrift compression treatment. A mounting 5 is shown in simplified form comprising upper and lower metal plates 6 and 7, respectively, and a body of rubber composition 8 interposed therebetween and bonded to the metal plates. As shown in Fig. 4, the rubber body 8 is in its normal, vulcanized condition. The dimension D represents the free height of the rubber stock of the mounting. This height preferably is greater than the resulting height of a treated mounting. Assuming, by way of example, that the height of the rubber composition of the untreated mounting is equal to 100 percent, the height E (Fig. 6) of the finished mounting after treatment is equal to about 85 percent.

In the process of treating a compression mounting a load is applied to the mounting in a direction to move the plates 6 and 7 in closer relationship. A preferred practice is to compress the rubber body to the extent that the dimension F (Fig. 5) will be equal to 50 percent of the free height D. After treatment in a manner as provided for tension mountings, hereinbefore described, the mounting assumes a permanent set of a height E and is in condition for commercial application.

Figure 7:
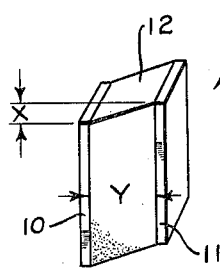
Figure 8:
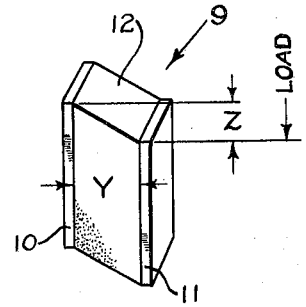
Figure 9:
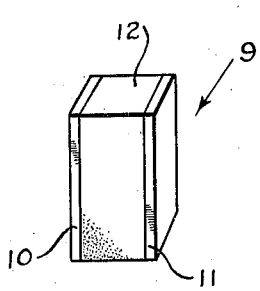

Shear type mountings may be predrifted in a substantially similar manner, as illustrated by Figs. 7, 8, and 9. A shear mounting 9 is formed of vertically disposed plates 10 and 11 in parallel, spaced relation. A body of rubber composition 12 is interposed between the plates and bonded thereto. Assuming that the plate 10 is attached to a support and the plate 11 supports a load, the arrangement of the parts is such that when the rubber composition is in its free state (Fig. 7) the plate 11 is positioned at a greater elevation than the plate 10. This difference in the height of the plates is represented by the letter X and is proportional to the thickness Y of the rubber body. The free state of the mounting is preferably such that the dimension X is equal to 0.3 of the dimension Y, the plate 11 being in an elevated position relative to the plate 10. In the process of treatment, a load is applied to the plate 11 in a manner parallel to the plate and in shear with respect to the rubber body 12. The load is such that the plate 11 becomes lowered from its elevated position, shown in Fig. 7, to the reverse position shown in Fig. 8. More specifically, the top of plate 11 becomes positioned below the horizontal level of the plate 10 to the extent that the dimension Z will be equal to about 0.6 of the dimension Y. In this condition of stress the rubber composition is subjected to heat treatment as hereinbefore described. After treatment and cooling, the load is removed and the mounting adjusts itself to assume a relaxed state which, as shown in Fig. 9, is such that the plates 10 and 11 are disposed in substantially the same horizontal plane.

From the foregoing examples it is apparent that the substantial decreases in drift attributed to the process of the present invention are applicable to various types of mountings in which the rubber composition is subject to stresses when under load. It is also apparent that the various rubber compositions, including synthetic rubber, react in substantially the same manner under the influence of the process, and that the range of hardness of rubber compositions suitable for mountings, as determined by durometer readings, respond readily to the treatment.

In referring to rubber composition it is to be understood that reference is made to a vulcanized rubber composition, although the degree of vulcanization may vary between a range from partially vulcanized to completely vulcanized rubber composition. If desired, the predrift heat treatment may be utilized to effect a completion of the vulcanization of partially vulcanized compositions.

While a preferred embodiment of the invention has been shown and described, it is to be understood that it is susceptible to those modifications which reasonably appear within the scope of the appended claims.

Having thus described my invention, what I claim and desire to protect by Letters Patent is:

1. The method of treating a mounting formed of relatively movable members and an interposed supporting body of vulcanized rubber composition attached thereto to reduce subsequent drifting, comprising the steps of stressing the rubber composition after its optimum vulcanization in a direction parallel to its normal load sustaining direction, uniformly heating the rubber composition while in a stressed condition, and relieving the rubber composition from the stressing force.

2. The method of treating a mounting formed of relatively movable members and an interposed supporting body of vulcanized rubber composition of considerable bulk attached thereto to reduce subsequent drifting, comprising the steps of stressing the rubber composition in a direction parallel to its normal load sustaining direction, uniformly heating the rubber composition while in a stressed condition, allowing the rubber composition to return to substantially normal room temperature, and relieving the rubber composition from the stressing force.

3. The method of treating a mounting formed of relatively movable members and an interposed supporting body of rubber composition of considerable bulk attached thereto, comprising the steps of stressing the rubber composition in a direction parallel to its normal load sustaining direction, uniformly heating the rubber composition to a temperature of at least 160 degrees Fahrenheit, and relieving the rubber composition from the stressing force.

4. The method of treating a mounting formed of relatively movable members and an interposed supporting body of rubber composition of considerable bulk attached thereto to reduce subsequent drifting, comprising the steps of stressing the rubber composition in a direction parallel to its normal load sustaining direction, uniformly heating the rubber composition to a temperature of between 160 degrees Fahrenheit and 260 degrees Fahrenheit for a period of between one and twelve hours, allowing the rubber composition to return to substantially normal room temperature, and relieving the rubber composition from the stressing force.

5. The method of treating a mounting formed of relatively movable members and an interposed supporting body of rubber composition of considerable bulk attached thereto to reduce subsequent drifting, comprising the steps of stressing the rubber composition in a direction parallel to its normal load sustaining direction, to an extent greater than the stressing of the rubber under normal load sustaining capacity, uniformly heating the rubber composition to a temperature of between 160 degrees Fahrenheit and 260 degrees Fahrenheit for a period of between one and twelve hours, allowing the rubber composition to return to substantially normal room temperature, and relieving the rubber composition from the stressing force.

6. The method of treating a mounting formed of relatively movable members and an interposed supporting body of at least partially vulcanized rubber composition attached thereto, comprising the steps of stressing the rubber composition in a direction parallel to its normal load sustaining direction, changing the thermal condition of the rubber composition to relieve the stress condition therein and to continue the vulcanization thereof, allowing the rubber composition to return to substantially normal room temperature, and relieving the rubber composition from the stressing force whereby its drifting characteristics under load are substantially reduced.

7. The method of treating a mounting formed of relatively movable members and an interposed supporting body of rubber composition attached thereto, comprising the steps of stressing the rubber composition in a direction parallel to its normal load sustaining direction, changing the thermal condition of the rubber composition to relieve the stress condition therein, allowing the rubber composition to return to substantially normal room temperature, and relieving the rubber composition from the stressing force whereby its drifting characteristics under load are substantially reduced.

ROBERT E. MERRILL.